US012594535B2

(12) United States Patent
Kim et al.

(10) Patent No.: US 12,594,535 B2
(45) Date of Patent: Apr. 7, 2026

(54) APARATUS AND METHOD FOR ACCELERATED MULTI-STAGE SYNTHESIS OF QUANTUM DOTS

(71) Applicants: SAMSUNG ELECTRONICS CO., LTD., Suwon-si (KR); NORTH CAROLINA STATE UNIVERSITY, Raleigh, NC (US)

(72) Inventors: Taekhoon Kim, Hwaseong-si (KR); Milad Abolhasani, Raleigh, NC (US); Hyeyeon Yang, Suwon-si (KR); Shin Ae Jun, Seongnam-si (KR); Robert W. Epps, Raleigh, NC (US)

(73) Assignees: SAMSUNG ELECTRONICS CO., LTD., Gyeonggi-do (KR); NORTH CAROLINA STATE UNIVERSITY, Raleigh, NC (US)

( * ) Notice: Subject to any disclaimer, the term of this patent is extended or adjusted under 35 U.S.C. 154(b) by 953 days.

(21) Appl. No.: 17/853,857

(22) Filed: Jun. 29, 2022

(65) Prior Publication Data

US 2024/0001326 A1     Jan. 4, 2024

(51) Int. Cl.
B01J 19/00 (2006.01)
*B82Y 30/00* (2011.01)
*B82Y 40/00* (2011.01)

(52) U.S. Cl.
CPC .. B01J 19/0053 (2013.01); *B01J 2219/00083* (2013.01); *B01J 2219/00085* (2013.01);
(Continued)

(58) Field of Classification Search
CPC .......... B01J 19/0053; B01J 2219/00083; B01J 2219/00085; B01J 2219/2467;
(Continued)

(56) References Cited

U.S. PATENT DOCUMENTS 7,252,814 B2     8/2007   De Mello et al.
7,419,637 B2     9/2008   Boren et al.
(Continued)

FOREIGN PATENT DOCUMENTS

CN          106607001 A    *   5/2017
JP          2006517511           7/2006
(Continued)

OTHER PUBLICATIONS

CN-106607001A—machine translation (Year: 2026).*
(Continued)

*Primary Examiner* — Huy Tram Nguyen
(74) *Attorney, Agent, or Firm* — CANTOR COLBURN LLP

(57)                    ABSTRACT

An apparatus for accelerated multi-stage synthesis of quantum dots (QDs) includes an injector which injects a material for producing QDs, a first reactor connected to the injector and including at least one selected from a coil reactor and a plate reactor, a second reactor connected to the first reactor and including at least one selected from the coil reactor and the plate reactor, and a first junction connected between the first reactor and the second reactor and provided with an inlet for injecting the material for producing the QDs.

14 Claims, 16 Drawing Sheets

(52) U.S. Cl.

CPC ........ *B01J 2219/2467* (2013.01); *B82Y 30/00* (2013.01); *B82Y 40/00* (2013.01)

(58) Field of Classification Search

CPC .... B01J 2219/00051; B01J 2219/00135; B01J 2219/00159; B01J 2219/00792; B01J 2219/00795; B01J 2219/00867; B01J 2219/00873; B01J 19/0093; B01J 19/242; B01J 19/243; B01J 19/1831; B01J 19/0013; B01J 19/1856; B82Y 30/00; B82Y 40/00; B82Y 20/00; C09K 11/565; C09K 11/70; C09K 11/883; C09K 11/62; B82B 3/0004

USPC ........................................................ 422/198

See application file for complete search history.

(56) References Cited

U.S. PATENT DOCUMENTS

| | | |
|---|---|---|
| 7,488,464 B2 | 2/2009 | Hammel et al. |
| 2008/0317650 A1 | 12/2008 | Boren et al. |
| 2010/0059428 A1 | 3/2010 | Boren et al. |
| 2017/0189879 A1* | 7/2017 | Simsek .................. B01J 19/004 |
| 2018/0273844 A1 | 9/2018 | Deshpande et al. |
| 2023/0021452 A1 | 1/2023 | Abolhasani et al. |

FOREIGN PATENT DOCUMENTS

| | | | |
|---|---|---|---|
| JP | 2021186788 | 12/2021 | |
| KR | 101074833 | 10/2011 | |
| KR | 1020170087643 A | 7/2017 | |
| KR | 101906403 B1 * | 10/2018 | .............. B01J 19/00 |
| KR | 1020180108134 | 10/2018 | |
| KR | 1020210050775 | 5/2021 | |
| WO | 2021188329 A1 | 9/2021 | |

OTHER PUBLICATIONS

Epps et al., "Artificial Chemist: An Autonomous Quantum Dot Synthesis Bot," Advanced. Materials, 2020, vol. 32, 9 pages.
Korean Office Action mailed Jan. 15, 2025 in KR Application No. 10-2022-0096986, 17 pages (w/English Translation).
Victor Sebastian Cabeza, et al., "Size-Controlled Flow Synthesis of Gold Nanoparticles Using a Segmented Flow Microfluidic Platform", Langmuir, (2012), vol. 28, pp. 7007-7013.

* cited by examiner

Single Injection Cycle

APARATUS AND METHOD FOR ACCELERATED MULTI-STAGE SYNTHESIS OF QUANTUM DOTS

BACKGROUND

(a) Field

Embodiments of the disclosure relate to an apparatus and a method for accelerated multi-stage synthesis of quantum dots (QDs).

(b) Description of the Related Art

Recent years have shown an accelerated development of QDs as energy-efficient luminescent materials. Cadmium-based QDs, such as CdSe, CdTe and CdS, have been promoted from their desired optical properties, etc. However, cadmium-based materials can result in environmental damage and have high toxicity; therefore, the development of high-performing cadmium-free QDs is desired to enable large-scale adoption of QDs by devices.

SUMMARY

One example of cadmium-free QDs is indium phosphide (InP). InP is considered the only class of QDs which offers a compatible, or even broader emission color range than the CdSe-based QDs, while eliminating intrinsic toxicity, as InP contains neither Class A elements (Cd, Hg, Pb), nor Class B elements (e.g. As, Se) (Xie et al. J. AM. CHEM. SOC., 2007, 129, 15432; Reiss et al. J. AM. CHEM. SOC., 2008, 130, 11588). However, synthesis of high-quality InP remains challenging. The existing problems include, among others, low photoluminescence quantum yield, poor size distribution, sensitive precursors, and poor control of the stability.

An embodiment provides an apparatus for multi-stage synthesis of QDs that allows precise injections of raw material and temperature gradient and/or step-by-step temperature control during reactions to form and grow the size and/or control the ingredients of QDs with accelerated kinetics.

An embodiment of an apparatus for accelerated multi-stage synthesis of QDs includes an injector which injects a material for producing QDs; a first reactor connected to the injector and including at least one selected from a coil reactor and a plate reactor; a second reactor connected to the first reactor and including at least one selected from the coil reactor and the plate reactor; and a first junction connected between the first reactor and the second reactor and provided with an inlet for injecting the material for producing the QDs.

In an embodiment, each of the first reactor and the second reactor may include a coil reactor, and the first junction may be a cross-junction provided with two inlets for injecting the material for producing the QDs.

In an embodiment, the apparatus may further include a third coil reactor connected to the second reactor and a second junction connected between the second reactor and the third coil reactor.

In an embodiment, the apparatus may further include a fourth coil reactor connected to the third coil reactor; and a third junction connected between the third coil reactor and the fourth coil reactor.

In an embodiment, each of the second junction and the third junction may be the cross-junction provided with the two inlets for injecting the material for producing the QDs.

In an embodiment, each of the second junction and the third junction may be a three-branch junction provided with a single inlet for injecting the material for producing the QDs.

In an embodiment, the first to fourth coil reactors may have independent temperatures and include tubes of which volume (length) are not equal.

In an embodiment, the apparatus may further include a detector positioned next to the second reactor, where the detector measure ultraviolet to visible light to near infrared (UV-Vis-NIR) absorption of the QDs.

In an embodiment, the first reactor may include a first coil reactor, and the second reactor may include a first plate reactor.

In an embodiment, the first junction may be a cross-junction provided with two inlets for injecting the material for producing the QDs or a three-branch junction provided with a single inlet for injecting the material for producing the QDs.

In an embodiment, the second reactor may further include a second coil reactor connected to the first plate reactor, a third coil reactor connected to the second coil reactor, and a fourth coil reactor connected to the third coil reactor.

In an embodiment, the first plate reactor may generate a temperature gradient therein, and the first to fourth coil reactors may have respective independent temperatures.

In an embodiment, the second reactor may further include a second plate reactor connected to the first coil reactor and a second coil reactor connected to the second plate reactor.

In an embodiment, the first plate reactor may include a tube spirally rolled in from an edge to a center of the first plate reactor and spirally rolled out from the center to the edge of the first plate reactor and the second plate reactor may include a tube repeatedly bent to reciprocate in a transverse direction, where the second plate reactor may gradually increase a temperature of the tube from an end connected to the first plate reactor to an end connected to the second coil reactor.

In an embodiment, the second coil reactor may include a tube having a larger inner diameter than a tube of the second plate reactor.

In an embodiment, the apparatus may further include a third coil reactor connected to the second coil reactor; and a second cross-junction connected between the second coil reactor and the third coil reactor.

An embodiment of a method for accelerated multi-stage synthesis of QDs includes injecting a precursor to a first flow reactor, adding the precursor to synthesized quantum dots from the first flow reactor, and transferring a mixture of the synthesized QDs from the first flow reactor and the precursor to a second flow reactor which synthesizes QDs.

In an embodiment, the method may further include adding the precursor to synthesized QDs from the second flow reactor and transferring a mixture of the synthesized QDs from the second flow reactor and the precursor to a third flow reactor which synthesizes QDs.

In an embodiment, the first flow reactor may preheat the precursor injected therein.

In an embodiment, the second flow reactor may include at least one selected from a coil reactor and a plate reactor, where the plate reactor may generate a temperature gradient therein.

DETAILED DESCRIPTION

Figure 1:
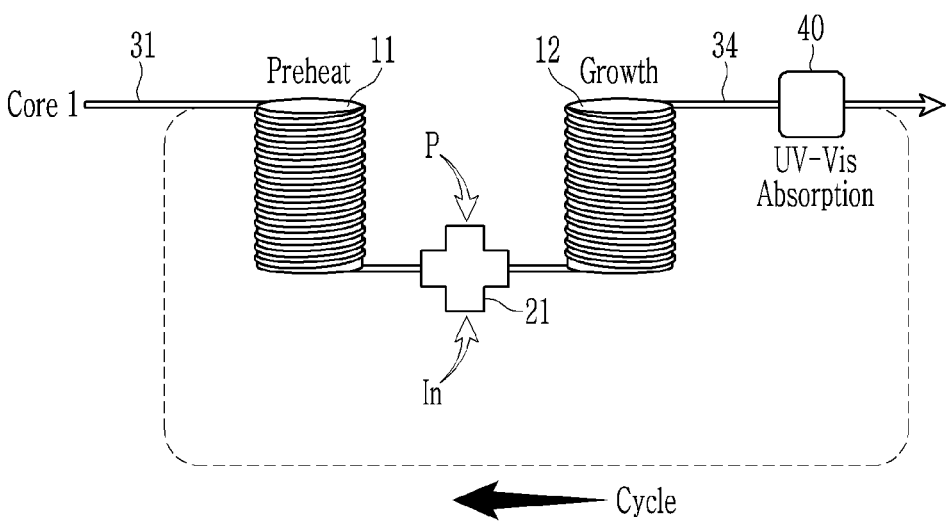
FIG. 1 is a schematic diagram of an embodiment of the apparatus for accelerated multi-stage synthesis of QDs.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The drawings and description are to be regarded as illustrative in nature and not restrictive. Like reference numerals designate like elements throughout the specification.

In the drawings, the size and thickness of each element may be arbitrarily illustrated for convenience of description, and the disclosure is not necessarily limited to what is illustrated in the drawings. In the drawings, the thickness of layers, films, plate, regions, etc., may be exaggerated for clarity. In the drawings, for better understanding and ease of description, the thicknesses of some layers and regions may be exaggerated.

As used herein, the singular forms, "a," "an," and "the" are intended to include the plural forms as well, unless the context clearly indicates otherwise.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an. "Or" means "and/or." As used herein, the term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from" for the purpose of its meaning and interpretation. For example, "at least one of A and B" may be understood to mean "A, B, or A and B."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, throughout the specification, the word "on" a target element will be understood to be positioned above or below the target element, and will not necessarily be understood to be positioned "at an upper side" based on a side opposite to the direction of gravity.

For example, the spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

In addition, unless explicitly described to the contrary, the word "comprise" and variations such as "comprises" or "comprising", "include" and variations such as "includes" or "including", "has" and variations such as "have" or "having" will be understood to imply the inclusion of stated elements but not the exclusion of any other elements.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
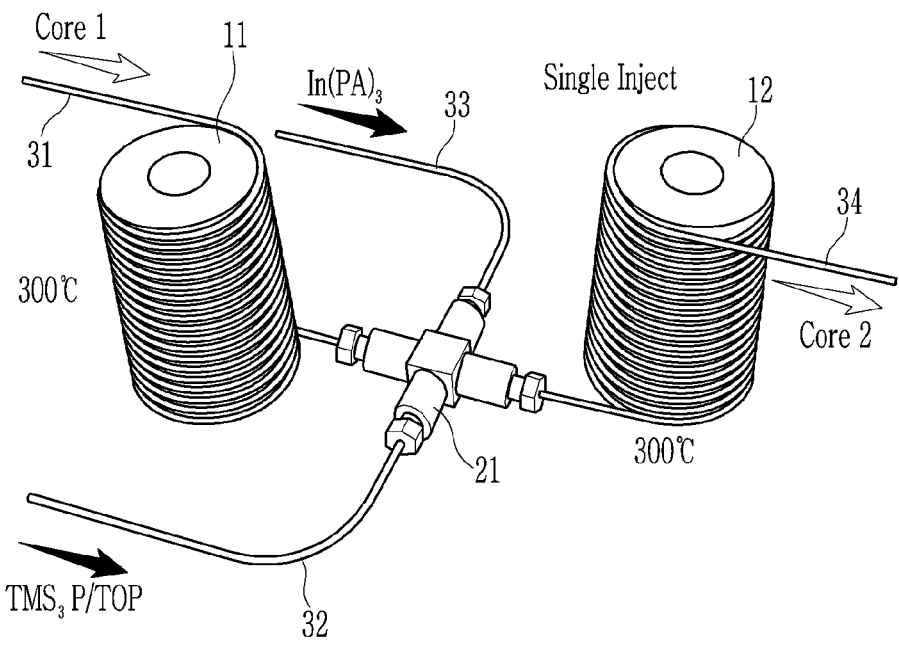
FIG. 2 is a structure diagram of the embodiment of FIG. 1.
Figure 3:
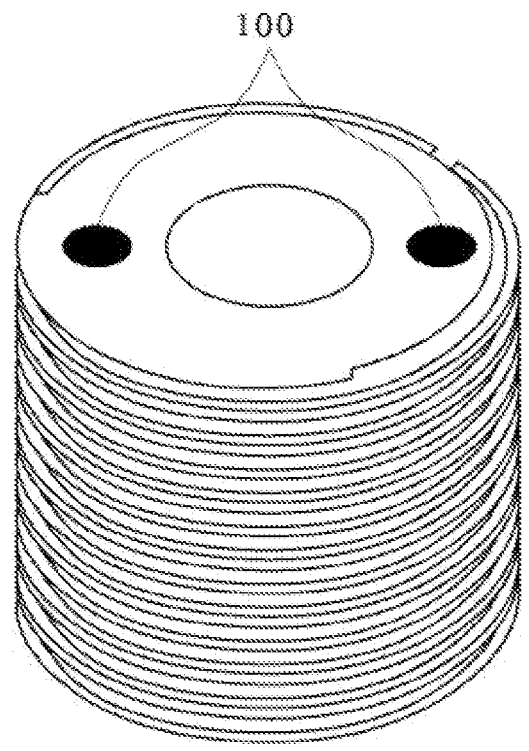
FIG. 3 is a perspective view of a general design of the cylindrical body of the coil reactors used in the embodiment of FIGS. 1 and 2.

FIG. 1 is a schematic diagram of an embodiment of the apparatus for accelerated multi-stage synthesis of QDs. FIG. 2 is a structure diagram of the embodiment of FIG. 1. FIG. 3 is a perspective view of a cylindrical body of the coil reactor used in the embodiment of FIGS. 1 and 2.

Referring to FIGS. 1 and 2, an embodiment of the apparatus for accelerated multi-stage synthesis of QDs may include a first coil reactor 11, a second coil reactor 12, a cross-junction 21 connected between the first coil reactor 11 and the second coil reactor 12, a detector 40 for measuring ultra violet to visible light to near infrared ("UV-Vis-NIR") absorption, and tubes 31, 32, 33, and 34 through which materials for synthesis of QDs such as Indium (In) precursor and Phosphorus (P) precursor and synthesized QDs flow. Not illustrated but injectors such as syringe pumps may be connected to the tubes 31, 32 and 33 for injecting the materials for synthesis of QDs. The detector 40 is for measuring the absorption properties of the synthesized QDs, but alternatively may be omitted.

Referring to FIGS. 2 and 3, the first and second coil reactors 11 and 12 may include a cylindrical body provided with spiral thread on a lateral surface thereof and holes for receiving heating sticks 100. The heating sticks 100 may heat up the cylindrical body by electrical heating (e.g., Joule heating). The cylindrical body may include or be made of a metal such as stainless steel, aluminum, or copper and have a polygonal cross-section instead of the circular cross-section. The first and second coil reactors 11 and 12 are examples of flow reactor modules. Alternatively, not illustrated but the first and second coil reactors 11 and 12 may be wrapped in aluminum foil to improve heat distribution. In such an embodiment, the first and second coil reactors 11 and 12 may be further wrapped in a fiberglass insulating fabric, and finally wrapped in a second layer of aluminum foil to reduce radiative heat loss.

The tubes 31 and 34 are coiled on the cylindrical body along the spiral thread and the tubes 32 and 33 are connected to the branches of the cross-junction 21. The tubes 31, 32, 33, and 34 may include or be made of Teflon™ or stainless steel. In an embodiment, Teflon™ perfluoroalkoxy (PFA) may be applied in a reaction performed at a temperature less than or equal to about 250° C. The stainless steel may be applied in a reaction performed at a temperature greater than 250° C. The tubes 31, 32, 33, and 34 may have an inner diameter in a range from 0.01 inch to 0.1 inch.

The cross-junction 21 may have four branches in which passages for material flow are formed to communicate each other. The four branches of the cross-junction 21 are respectively connected to the tubes 31, 32, 33, and 34. The cross-junction 21 may include or be made of polyetheretherketone (PEEK) or stainless steel.

In an embodiment of the apparatus, the materials for synthesis of QDs (Core 1) such as Indium (In) precursor and Phosphorus (P) precursor or an initial QDs material may be injected together to the tube 31 and reacted to synthesize QDs on the first coil reactor 11, then the synthesized QDs are transferred to the second coil reactor 12 through the cross-junction 21. The materials for synthesis of QDs such as Indium (In) precursor and Phosphorus (P) precursor may be additionally injected to the tubes 32 and 33 and transferred to the second coil reactor 12 along with the synthesized QDs from the first coil reactor 11. In the second coil reactor 12, the QDs from the first coil reactor 11 are grown up with the additionally injected materials. The first coil reactor 11 may be used to preheat the materials for synthesis of QDs or the initial QDs material. In such an embodiment of the apparatus, the QDs may be synthesized with a very small amount of the materials for synthesis of QDs or the initial QDs material. The QDs may be synthesized with 0.5 ml to 2 ml of the materials for synthesis of QDs or the initial QDs material, therefore the materials for synthesis of QDs or the initial QDs material may be significantly saved. To reduce the amount of the materials for synthesis of QDs or the initial QDs material, a spacer gas or liquid may be used to fill the space in the tubes 31, 32, 33, and 34, which is not occupied by the materials for synthesis of QDs or the initial QDs material.

Figure 4:
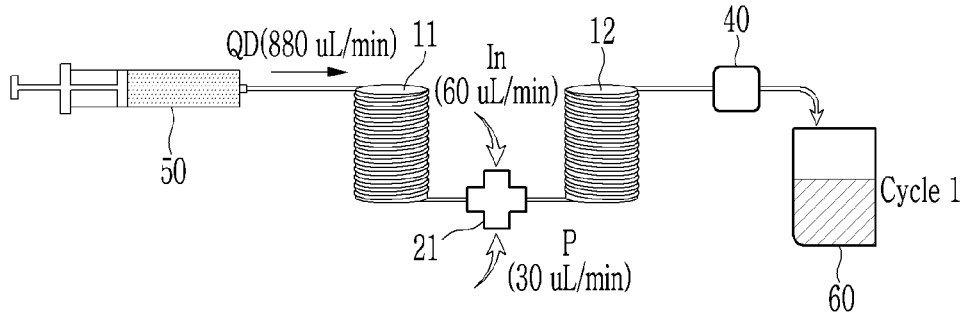
FIG. 4 is a schematic diagram showing an embodiment of a method of synthesizing QDs using the apparatus of FIGS. 1 and 2.
Figure 4:
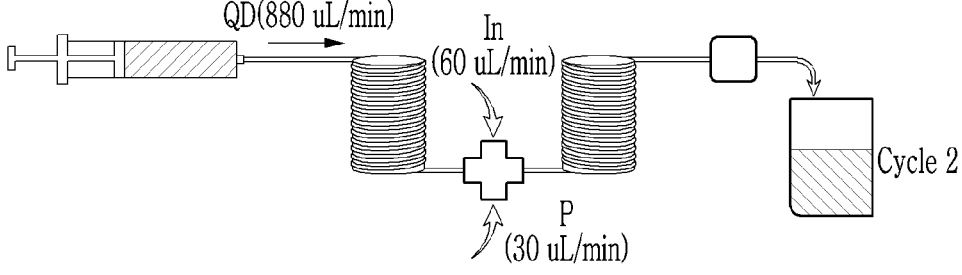
Figure 4:
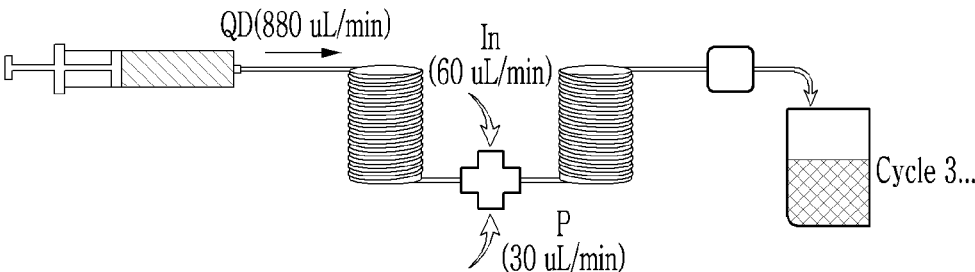

FIG. 4 is a schematic diagram showing an embodiment of a method of synthesizing QDs using the apparatus of FIGS. 1 and 2.

An initial QDs material is injected into the first coil reactor 11 by an injector 50 such as a syringe pump. The injection may be performed at the volumetric flowrate in a range from about 50 uL/min to about 5000 uL/min. The first coil reactor 11 may be set to have a temperature in a range from about 260° C. to about 320° C. The initial QDs material is instantly heated up to the reaction temperature in a range of about 260° C. to about 320° C. while flowing through the tube of the first coil reactor 11. The heated QDs material flows to the cross-junction 21 and is mixed with the materials for synthesis of QDs such as Indium (In) precursor and Phosphorus (P) precursor which are additionally injected at the cross-junction 21. The Indium (In) precursor may be Indium palmitate (In(PA)$_3$), which is an example of Indium carboxylate, and may be injected at a speed of about 60 uL/min to about 600 uL/min. The Phosphorus (P) precursor may be a solution of Tris(trimethylsilyl)phosphine and Tri-octylphospine (TMS$_3$P/TOP) and may be injected at the volumetric flowrate of about 30 uL/min to about 300 uL/min. The mixture of heated QDs material and the materials for synthesis of QDs flows into the second coil reactor 12 and reacts to grow the size of the QDs (Cycle 1). The QDs material output from the second coil reactor 12 (Core 2) in Cycle 1 is injected again into the first coil reactor 11 and the same process as Cycle 1 is repeated twice (Cycles 2 and 3) or more. Through this repetition of the single injection cycle, the initial QDs are grown up to a predetermined size, causing a red shift in the first excitonic peak absorption wavelength. Therefore, a blue QDs may be grown up to a green QDs or a red QDs.

Figure 5:
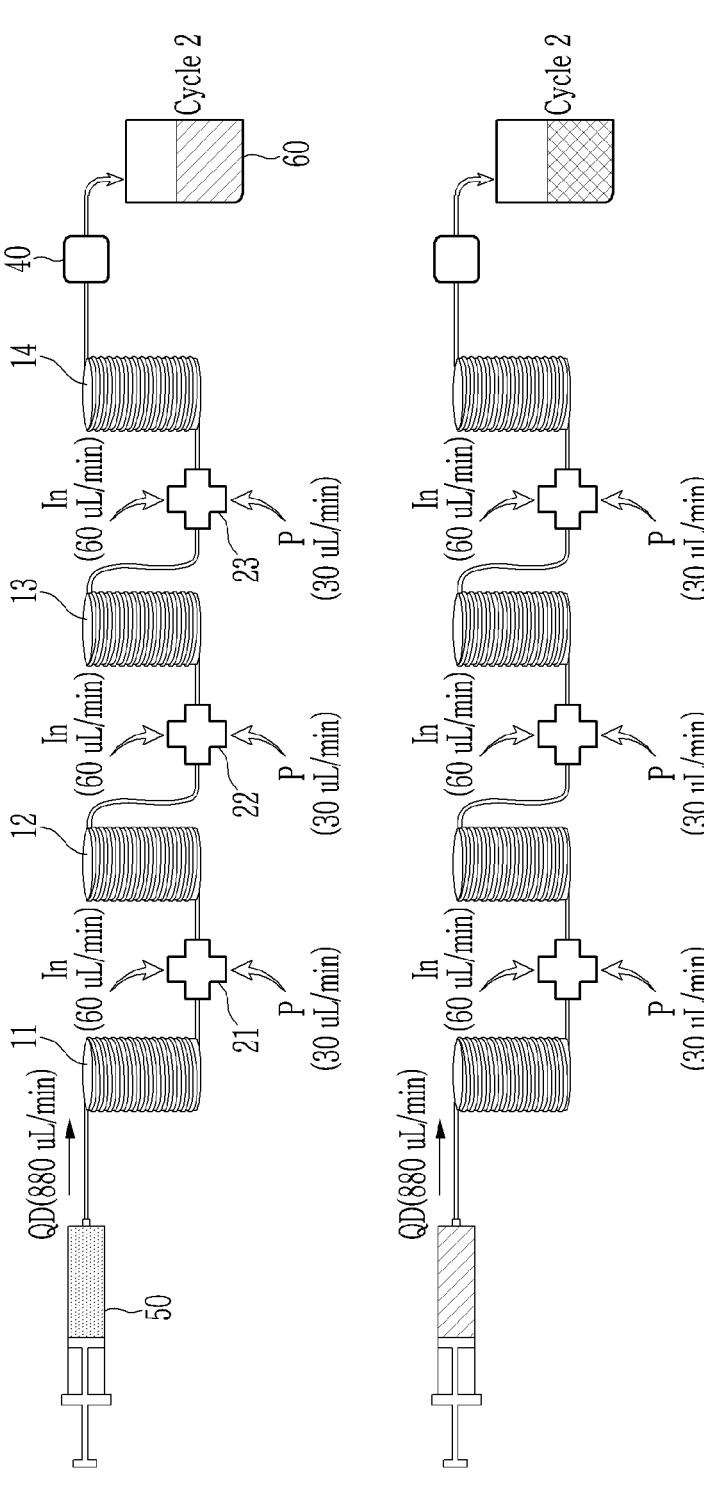
FIG. 5 is a schematic diagram showing an embodiment of a method of synthesizing QDs using an alternative embodiment of the apparatus for accelerated multi-stage synthesis of QDs.

FIG. 5 is a schematic diagram showing an embodiment of a method of synthesizing QDs using an alternative embodiment of the apparatus for accelerated multi-stage synthesis of QDs.

In an alternative embodiment of the apparatus for accelerated multi-stage synthesis of QDs, as shown in FIG. 5, third and fourth coil reactors 13 and 14 are further connected to the second coil reactor 12 in series via a second and third cross-junctions 22 and 23. The number of the coil reactors connected to each other in series in the apparatus for accelerated multi-stage synthesis of QDs is not limited to four but may be increased to five or more or decreased to three. The number of cross-junctions in the apparatus for accelerated multi-stage synthesis of QDs is not limited to three but may be increased to four or more or decreased to two depending on the number of coil reactors.

The initial QDs material is preheated at the first coil reactor 11 and grown up while flowing through the second to fourth coil reactors 12, 13, 14 with the added materials for synthesis of QDs at the cross-junctions 21, 22, 23 (Cycle 1). The QDs material output from the fourth coil reactor 14 in Cycle 1 is injected again into the first coil reactor 11 and the same process as Cycle 1 is repeated (Cycle 2). Through this repetition of the triple injection cycle, the initial QDs are grown up to a predetermined size. Therefore, a blue QDs may be grown up to a green QDs or a red QDs.

Figure 6:
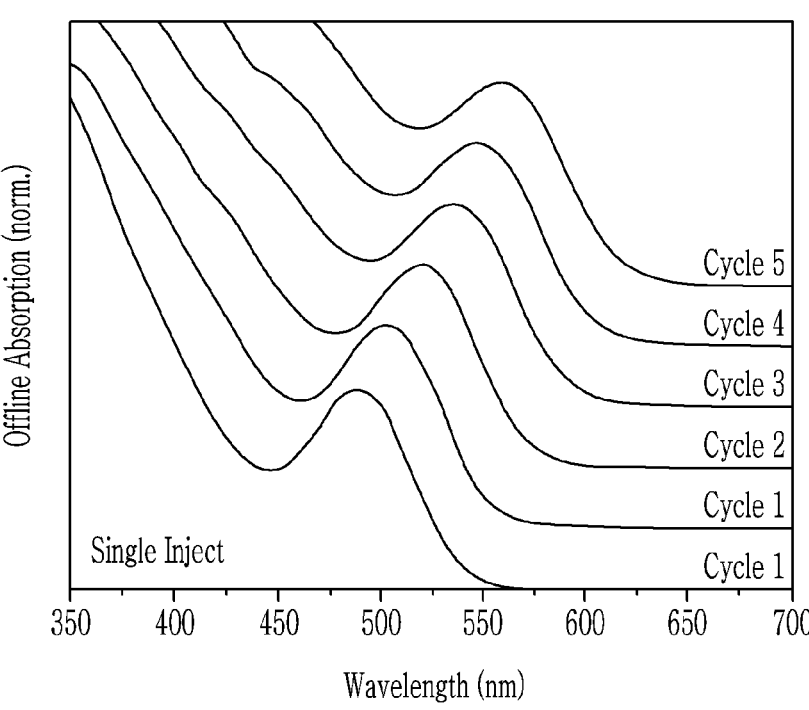
FIG. 6 illustrates graphs showing absorption wavelength shift depending on cycles of synthesize in the method of FIG. 4.
Figure 7:
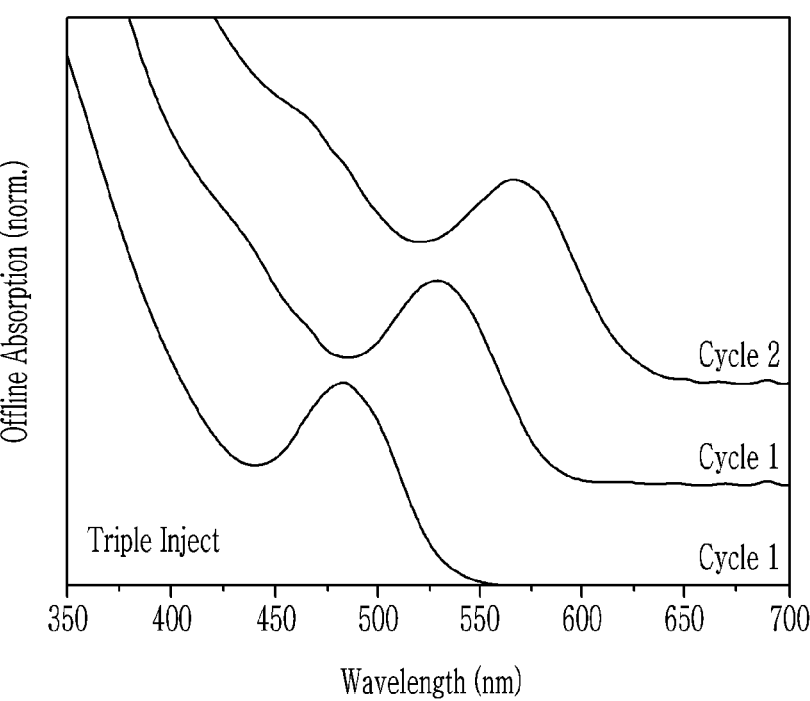
FIG. 7 illustrates graphs showing absorption wavelength shift depending on cycles of synthesize in the method of FIG. 5.

FIG. 6 illustrates graphs showing absorption wavelength shift depending on cycles of synthesize according to the method of FIG. 4. FIG. 7 illustrates graphs showing absorption wavelength shift depending on cycles of synthesize according to the method of FIG. 5.

Referring to FIG. 6, the absorption peak of the QD, which is produced by the single injection cycle, shifts to a longer wavelength as the repetition number of cycles increases. Referring to FIG. 7, the absorption peak of the QD, which is produced by the triple injection cycle, also shifts to a longer wavelength as the repetition number of cycles increases. However, the shift amount per cycle is greater than that of FIG. 6.

Figure 8:
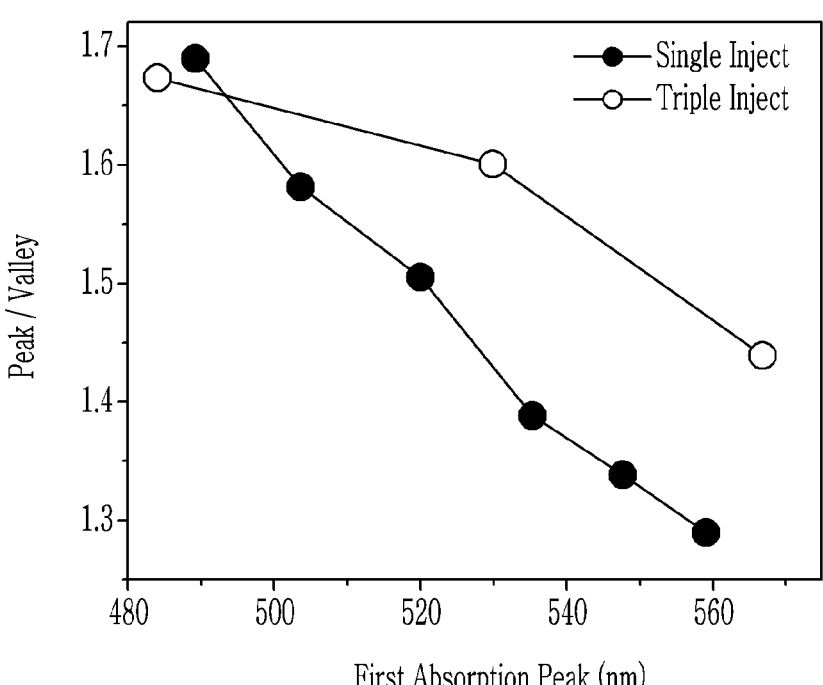
FIG. 8 illustrates graphs showing peak/valley ratio change depending on cycles of synthesize in the methods of FIGS. 4 and 5.

FIG. 8 illustrates graphs showing peak/valley ratio change depending on cycles of synthesize according to the methods of FIGS. 4 and 5.

The peak/valley ratio of the absorption peak decreases as the repetition number of cycles increases in both methods. However, the decreasing amount of peak/valley ratio is less in the method of FIG. 5 (the triple injection cycle) than in the method of FIG. 4 (the single injection cycle). A QDs having a greater peak/valley ratio may provide a better color reproducibility.

Figure 9:
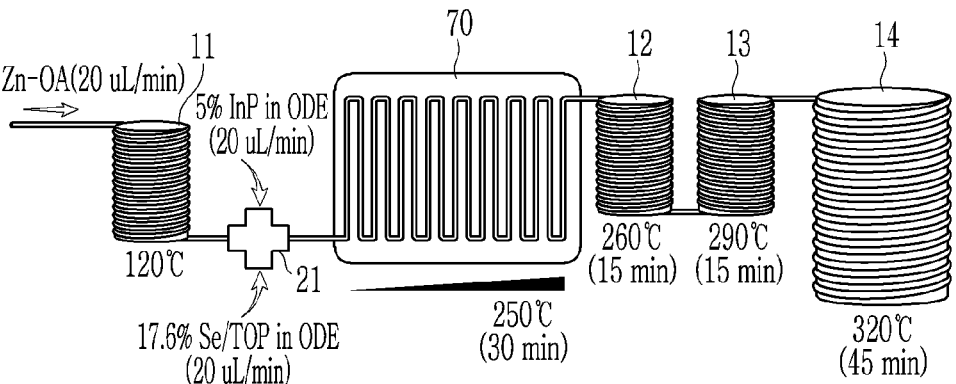
FIG. 9 is a schematic diagram of an alternative embodiment of the apparatus for accelerated multi-stage synthesis of QDs.

FIG. 9 is a schematic diagram of an alternative embodiment of the apparatus for accelerated multi-stage synthesis of QDs.

An embodiment of the apparatus for accelerated multi-stage synthesis of QDs may include first to fourth coil reactors 11, 12, 13, and 14, a plate reactor 70, a cross-junction 21 connected between the first coil reactor 11 and the plate reactor 70, and a plurality of tubes (reference numerals are not shown). Not illustrated but injectors such as syringe pumps may be connected to the tube of the first coil reactor 11 and the branches of the cross-junction 21 for injecting the materials for synthesis of QDs, such as Zinc Oleate (Zn-OA), Indium Phosphine QDs in Octadecene (InP in ODE), and (Selenium+Trioctylphosphine) solution in Octadecene (Se/TOP in ODE). The second coil reactor 12 is connected to the plate reactor 70 and the second and fourth coil reactors 12, 13, and 14 are connected in series.

The plate reactor 70 may include a tube repeatedly bent to reciprocate in a transverse direction and may gradually increase the temperature of the tube from the end connected to the cross-junction 21 to the end connected to the second coil reactor 12. In an embodiment, a temperature gradient in the plate reactor 70 may be embodied by distributing a plurality of heating sticks (not illustrated) parallel to each other and to be arranged in a direction of the temperature gradient and driving the heating sticks to generate different temperatures from each other. The first to fourth coil reactors 11, 12, 13, and 14 may have a similar structure as the coil reactors described above with reference to FIGS. 1 to 3.

The first coil reactor 11 may receive Zn-OA at the flow speed of about 20 uL/min and preheat the Zn-OA up to about 120° C. The preheated Zn-OA flows to the cross-junction 21 and may be mixed with the 5% InP in ODE and the 17.6% of Se/TOP in ODE injected through the branches of the cross-junction 21 at the flow speed of about uL/min, respectively. The mixture of Zn-OA, InP in ODE and Se/TOP in ODE flows into the plate reactor 70 and gradually heated to increase the temperature up to about 250° C. The gradually heated mixture sequentially flows into the second coil reactor 12, which may be set to have a temperature of about 260° C., the third coil reactor 13, which may be set to have a temperature of about 290° C., and the fourth coil reactor 14, which may be set to have a temperature of about 320° C. The tube of the plate reactor 70 may be set to have a length to take about 30 minutes to pass through. The tubes of the second to fourth coil reactors 12, 13, and 14 may be set to have lengths to take about 15 minutes, about 15 minutes, and about 45 minutes respectively. The mixture of Zn-OA, InP in ODE and Se/TOP in ODE reacts to synthesize QDs having ZnSe core and InP shell while passes through the plate reactor 70 and the second to fourth coil reactors 12, 13, and 14. The temperatures and tube lengths of the reactors 11, 12, 13, 14, and 70 may be variously modified depending on the ingredient, size and structure of the QDs set to produce.

Figure 10:
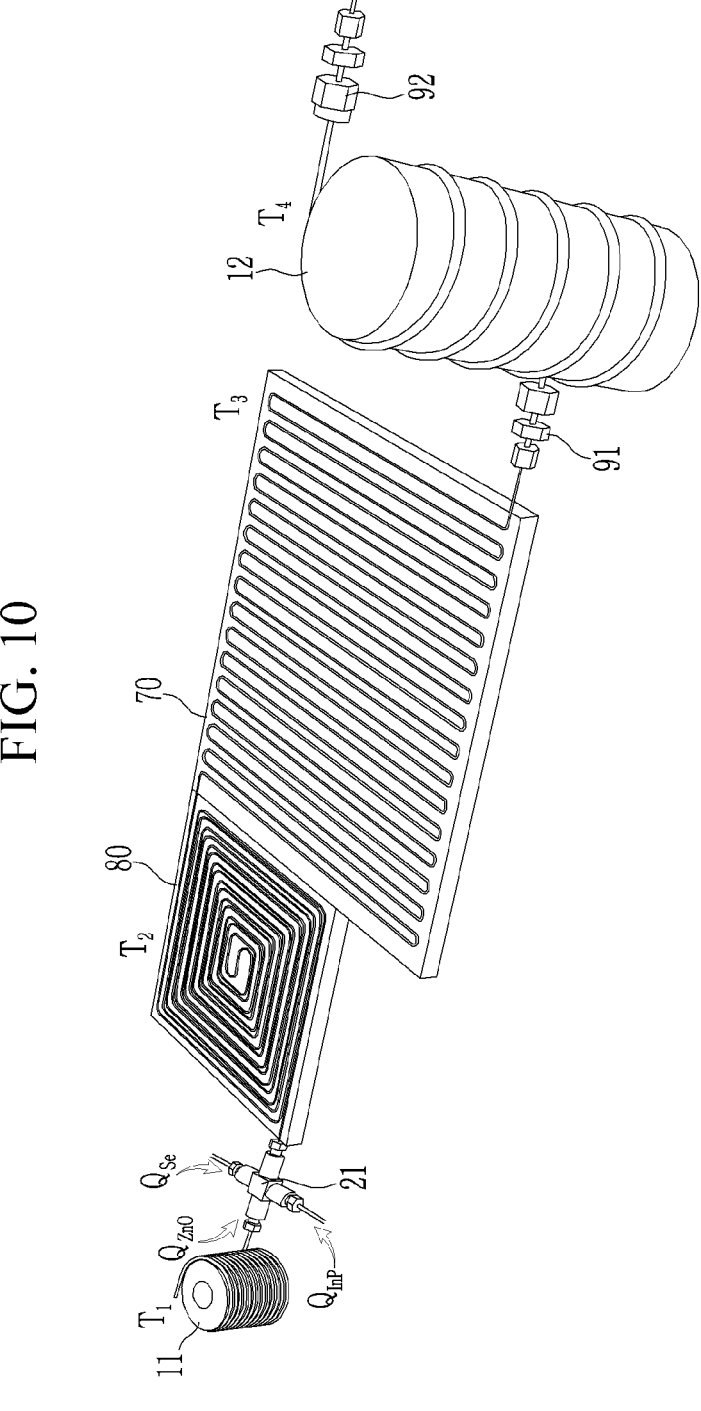
FIG. 10 is a schematic diagram of another alternative embodiment of the apparatus for accelerated multi-stage synthesis of QDs.

FIG. 10 is a schematic diagram of another alternative embodiment of the apparatus for accelerated multi-stage synthesis of QDs.

An embodiment of the apparatus for accelerated multi-stage synthesis of QDs may include first and second coil reactors 11 and 12, first and second plate reactors 80 and 70, a cross-junction 21 connected between the first coil reactor 11 and the first plate reactor 80, junctions 91 and 92 connecting the tube of the second coil reactor 12 to the tube of the second plate reactor 70 and to the outlet tube (reference numeral are omitted). Not illustrated but injectors such as syringe pumps may be connected to the tube of the first coil reactor 11 and the branches of the cross-junction 21 for injecting the materials for synthesis of QDs, such as Zn-OA, InP in ODE, and Se/TOP in ODE. The first plate reactor 80 is connected to the second plate reactor 70 and the second plate reactor 70 is connected to the second coil reactor 12.

The first plate reactor 80 may include a tube spirally rolled in from the edge to the center of the first plate reactor 80 and spirally rolled out from the center to the edge of the first plate reactor 80. The second plate reactor 70 may include a tube repeatedly bent to reciprocate in a transverse direction and may gradually increase the temperature of the tube from the end connected to the first plate reactor 80 to the end connected to the second coil reactor 12. This temperature gradient in the second plate reactor 70 may be embodied by distributing a plurality of heating sticks (not illustrated) parallel to each other and to be arranged in a direction of the temperature gradient and driving the heating sticks to generate different temperatures from each other. The second coil reactor 12 may include a tube having a larger inner diameter than the tubes of the second plate reactor 70 and outlet.

The temperatures T1, T2, T3 and T4, tube lengths and tube diameters of the reactors 11, 12, 80, and 70 may be variously modified depending on the ingredient, size and structure of the QDs set to produce.

Figure 11:
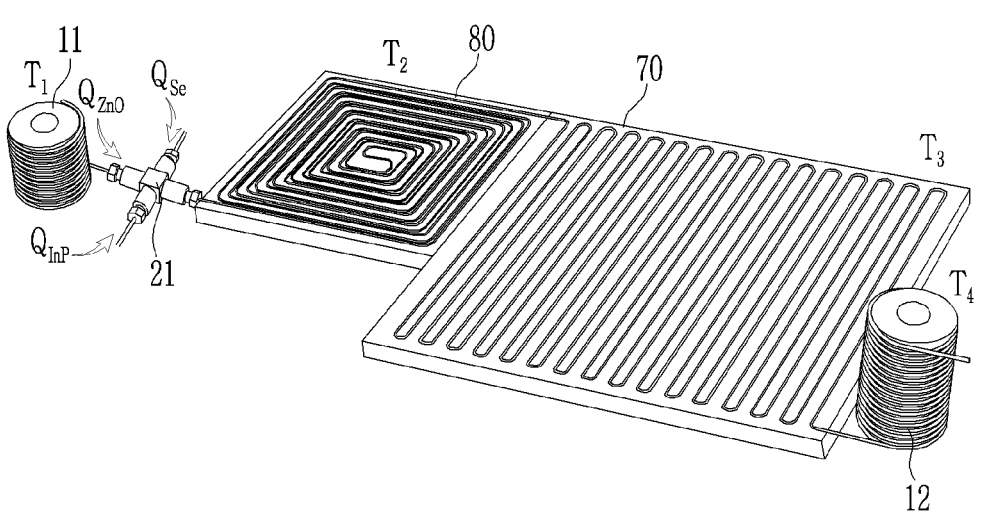
FIG. 11 is a schematic diagram of another alternative embodiment of the apparatus for accelerated multi-stage synthesis of QDs.

FIG. 11 is a schematic diagram of another alternative embodiment of the apparatus for accelerated multi-stage synthesis of QDs.

An embodiment of the apparatus for accelerated multi-stage synthesis of QDs shown in FIG. 11 is similar to the embodiment shown in FIG. 10 except for the second coil reactor 12. In such an embodiment, as shown in FIG. 11, the second coil reactor 12 has a tube of which inner diameter is the same as that of the other tubes and is connected to the tubes of the second plate reactor 70 and outlet without any junction.

Figure 12:
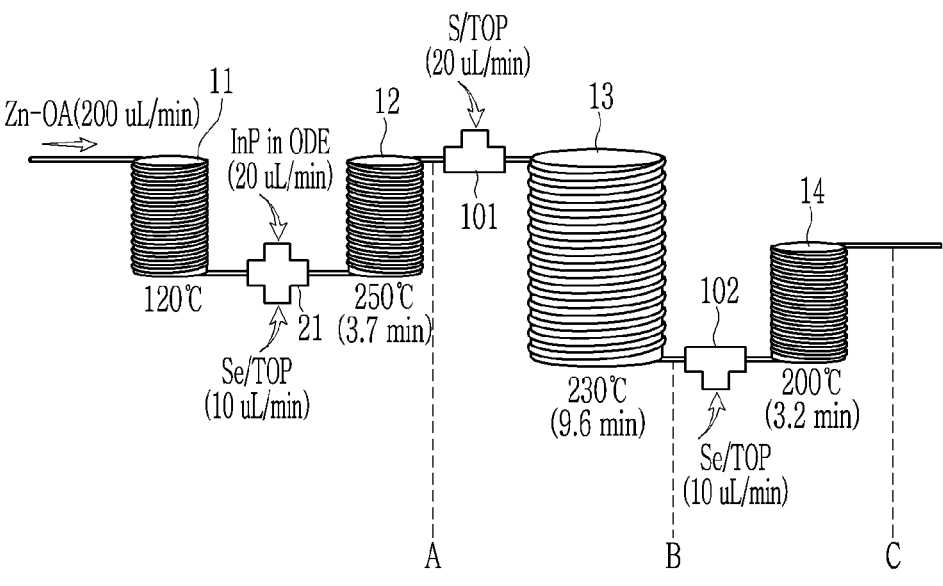
FIG. 12 is a schematic diagram of another alternative embodiment of the apparatus for accelerated multi-stage synthesis of QDs.

FIG. 12 is a schematic diagram of another alternative embodiment of the apparatus for accelerated multi-stage synthesis of QDs.

Referring to FIG. 12, an embodiment of the apparatus for accelerated multi-stage synthesis of QDs may include first to fourth coil reactors 11, 12, 13, and 14, a cross-junction 21 connected between the first coil reactor 11 and the second coil reactor 12, a first three-branch junction 101 connected between the second coil reactor 12 and the third coil reactor 13, a second three-branch junction 102 connected between the third coil reactor 13 and the fourth coil reactor 14, and tubes (reference numerals are not shown) through which the materials for synthesis of QDs, such as Zn-OA, InP in ODE, and Se/TOP in ODE. Not illustrated but injectors such as syringe pumps may be connected to the tubes for injecting the materials for synthesis of QDs.

The first to fourth coil reactors 11, 12, 13, and 14 may have a similar structure as the coil reactors described in the previous embodiment of FIGS. 1 to 3. The first and second three-branch junction 101 and 102 respectively have first and second branches connected to the reactors and a third branch through which a material for synthesis of QDs such as (Sulfur+Trioctylphosphine) solution (S/TOP) is injected.

The first coil reactor 11 may receive Zn-OA at the flow speed of about 50 uL/min to about 1000 uL/min and preheat the Zn-OA up to a temperature of about 100° C. to about 160° C. The preheated Zn-OA flows to the cross-junction 21 and may be mixed with InP in ODE and Se/TOP in ODE injected through the branches of the cross-junction 21 at the flow speed of about 20 uL/min to about 200 uL/min and at the flow speed of about 10 uL/min to about 100 uL/min, respectively. The mixture of Zn-OA, InP in ODE and Se/TOP in ODE flows into the second coil reactor 12, which may be set to have a temperature of about 200° C. to about 250° C. and reacts therein. The mixture from the second coil reactor 12 flows into the first three-branch junction 101 and may be added with S/TOP injected through the third branch of the first three-branch junction 101. The mixture from the first three-branch junction 101 flows into the third coil reactor 13, which may be set to have a temperature of about 230° C., and reacts therein. The mixture from the third coil reactor 13 flows into the second three-branch junction 102 and may be added with S/TOP injected through the third branch of the second three-branch junction 102. The mixture from the second three-branch junction 102 flows into the fourth coil reactor 14, which may be set to have a temperature of about 170° C. to about 250° C., and reacts therein. The tube of the first coil reactor 11 may be set to have a volume (length) large enough to heat up Zn-OA to a temperature of about 25° C. to about 160° C. The tubes of the second to fourth coil reactors 12, 13, and 14 may be set to have volumes (lengths) to take about 3.7 minutes, about 9.6 minutes, and about 3.2 minutes to flow through, respectively. The mixture of Zn-OA, InP in ODE and Se/TOP in ODE reacts to synthesize QDs having ZnSe core and InP shell while passes through the second to fourth coil reactors 12, 13, and 14. The temperatures and tube lengths of the reactors 11, 12, 13, and 14 may be variously modified depending on the ingredient, size and structure of the QDs planned to produce.

Figure 13:
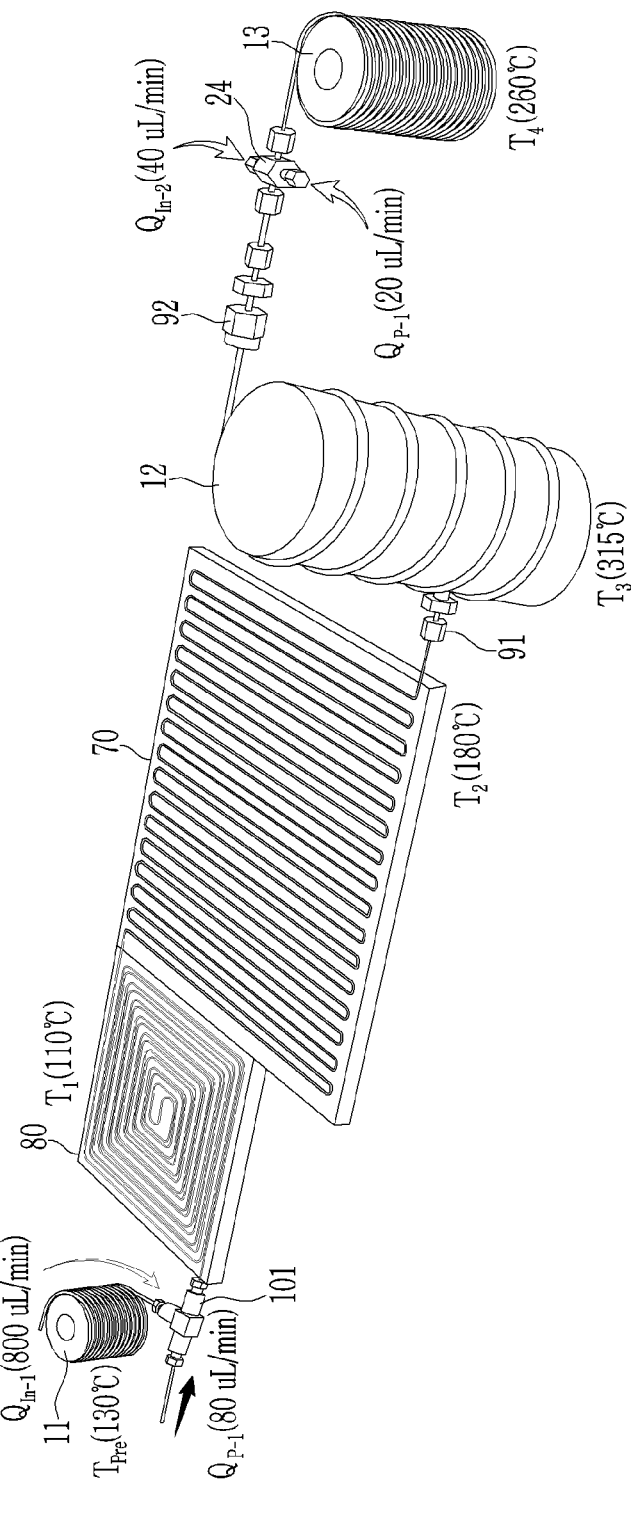
FIG. 13 is a schematic diagram of another alternative embodiment of the apparatus for accelerated multi-stage synthesis of QDs.

FIG. 13 is a schematic diagram of another alternative embodiment of the apparatus for accelerated multi-stage synthesis of QDs.

An embodiment of the apparatus for accelerated multi-stage synthesis of QDs shown in FIG. 13 is similar to the embodiment shown in FIG. 10 except for the three-branch junction 101, the cross-junction 24, and the third coil reactor 13. The three-branch junction 101 is connected between the first coil reactor 11 and the first plate reactor 80. The three-branch junction 101 may receive Phosphorus (P) precursor from an injector (not shown) and preheated Indium (In) precursor from the first coil reactor 11 and transfer the mixture of the Phosphorus (P) precursor and the preheated Indium (In) precursor to the first plate reactor 80. The cross-junction 24 is connected between the junction 92 and the third coil reactor 13. The cross-junction 24 may receive Phosphorus (P) precursor and Indium (In) precursor from injectors (not shown) and synthesized QDs material from the second coil reactor 12 and transfer the mixture of the Phosphorus (P) precursor, the Indium (In) precursor and the synthesized QDs material to the third coil reactor 13. The junction 92 may be omitted. The mixture of the Phosphorus (P) precursor, the Indium (In) precursor and the synthesized QDs material reacts in the third coil reactor 13 to produce QDs with greater size.

Figure 14:
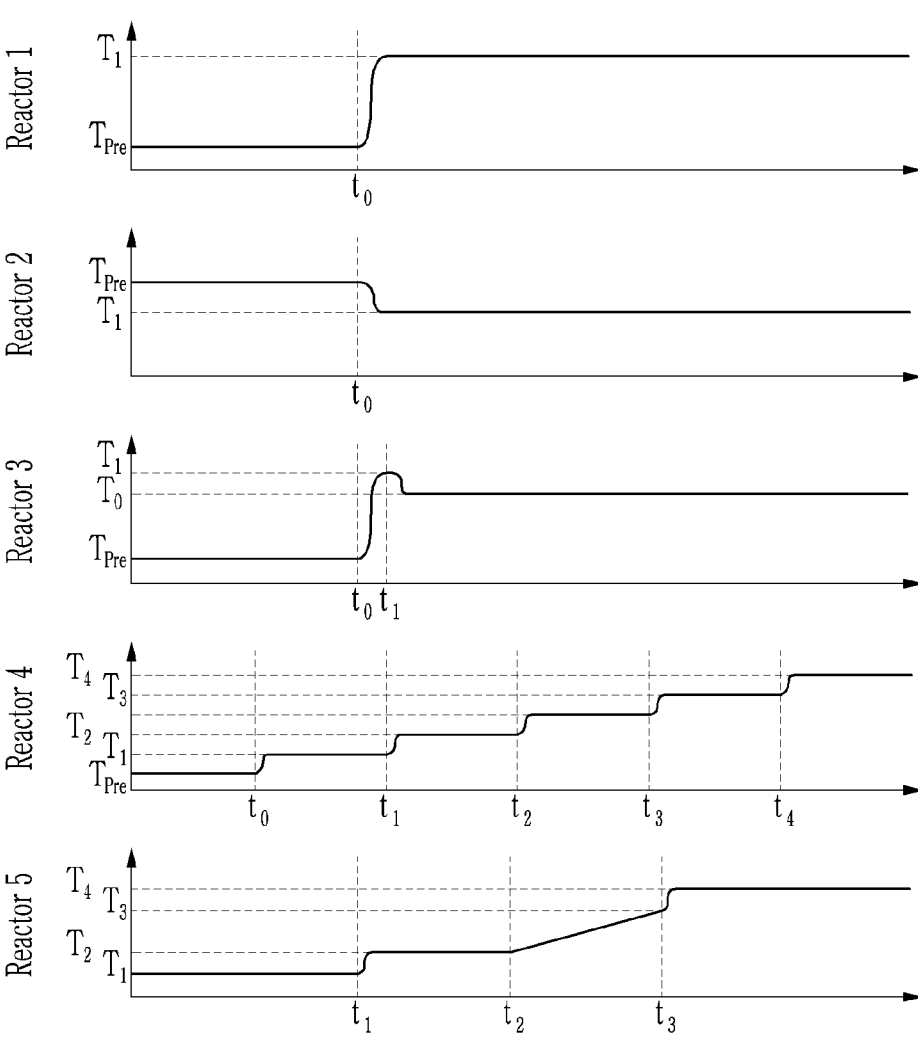
FIG. 14 illustrates graphs showing various temperature change during synthesizing QDs using the embodiments of FIGS. 9-13.

FIG. 14 illustrates graphs showing various temperature change during synthesizing QDs using the embodiments of FIGS. 9-13.

FIG. 14 shows five examples of temperature control for synthesizing QDs using the embodiments of FIGS. 9-13. The first example (Reactor 1) represents one step temperature hike at the time of t0. The second example (Reactor 2) represents one step temperature lowering at the time of t0.

The third example (Reactor 3) represents one step temperature hike at the time of t0 and one step temperature lowering at the time of t1. The fourth example (Reactor 4) represents five steps of temperature hike at the times of t0, t1, t2, t3, and t4. The fifth example (Reactor 5) represents two steps of temperature hike at the time of t1 and t3 and one period of gradual temperature increase from t2 to t3. Temperature control may be varied depending on the final material to produce and the initial materials applied in the producing process.

Figure 15:
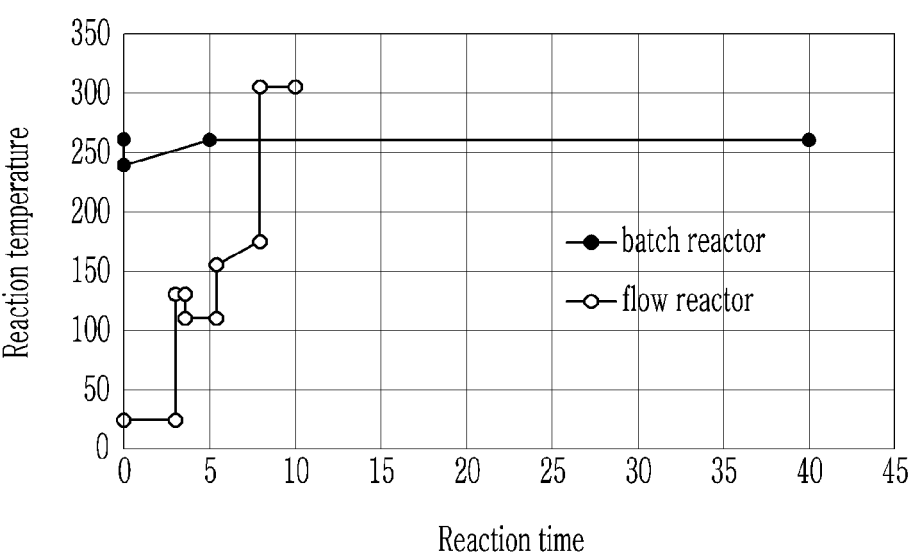
FIG. 15 illustrates graphs showing temperature change during synthesizing QDs using one of the embodiments of FIGS. 9-13 and temperature change during synthesizing QDs using a batch reactor.
Figure 16:
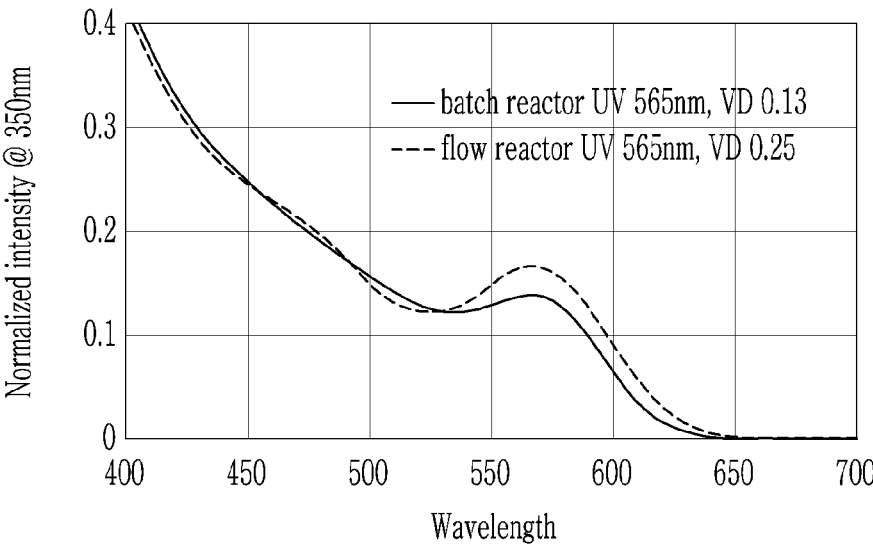
FIG. 16 illustrates graphs showing absorption wavelength of QDs synthesized by the methods of FIG. 15.

FIG. 15 illustrates graphs showing temperature change during synthesizing QDs using one of the embodiments of FIGS. 9-13 and temperature change during synthesizing QDs using a batch reactor. FIG. 16 illustrates graphs showing absorption wavelength of QDs synthesized by the methods of FIG. 15.

When a method using an embodiment of the invention (i.e., a flow reactor) is applied, the reaction time for synthesizing QDs may be significantly shortened than the conventional method using a batch reactor due to accelerated heat and mass transfer rates. Referring to FIG. 16, the QDs synthesized by an embodiment of the invention shows a sharper absorption peak (i.e., higher quality) than the QDs synthesized by the conventional method using a batch reactor.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An apparatus for accelerated multi-stage synthesis of quantum dots, the apparatus comprising:
   an injector which injects a material for producing the quantum dots;
   a first reactor connected to the injector and including at least one selected from a coil reactor and a plate reactor;
   a second reactor connected to the first reactor and including at least one selected from the coil reactor and the plate reactor; and
   a first junction connected between the first reactor and the second reactor and provided with an inlet for injecting the material for producing the quantum dots,
   a third coil reactor connected to the second reactor;
   a second junction connected between the second reactor and the third coil reactor;
   a fourth coil reactor connected to the third coil reactor; and
   a third junction connected between the third coil reactor and the fourth coil reactor,
   wherein each of the first reactor and the second reactor comprises a coil reactor,
   the first junction is a cross-junction provided with two inlets for injecting the material for producing the quantum dots,
   wherein each of the second junction and the third junction is a three-branch junction provided with a single inlet for injecting the material for producing the quantum dots, and wherein the first to fourth coil reactors have respective independent temperatures and include tubes of which length are not equal.

2. The apparatus of claim 1, further comprising:
   a detector disposed next to the second reactor, wherein the detector measures ultraviolet to visible light to near infrared absorption of the quantum dots.

3. An apparatus for accelerated multi-stage synthesis of quantum dots, the apparatus comprising:
   an injector which injects a material for producing the quantum dots;
   a first reactor connected to the injector and including at least one selected from a coil reactor and a plate reactor;
   a second reactor connected to the first reactor and including at least one selected from the coil reactor and the plate reactor;
   a first junction connected between the first reactor and the second reactor and provided with an inlet for injecting the material for producing the quantum dots,
   wherein the first reactor comprises a first coil reactor and the second reactor comprises a first plate reactor.

4. The apparatus of claim 3, wherein the first junction is a cross-junction provided with two inlets for injecting a material for producing the quantum dots or a three-branch junction provided with a single inlet for injecting the material for producing the quantum dots.

5. The apparatus of claim 4, wherein the second reactor further comprises a second coil reactor connected to the first plate reactor, a third coil reactor connected to the second coil reactor, and a fourth coil reactor connected to the third coil reactor.

6. The apparatus of claim 5, wherein
   the first plate reactor generates a temperature gradient therein, and
   the first to fourth coil reactors have respective independent temperatures.

7. The apparatus of claim 4, wherein the second reactor further comprises a second plate reactor connected to the first coil reactor and a second coil reactor connected to the second plate reactor.

8. The apparatus of claim 7, wherein
   the first plate reactor includes a tube spirally rolled in from an edge to a center of the first plate reactor and spirally rolled out from the center to the edge of the first plate reactor and
   the second plate reactor includes a tube repeatedly bent to reciprocate in a transverse direction, wherein the second plate reactor gradually increases a temperature of the tube from an end connected to the first plate reactor to an end connected to the second coil reactor.

9. The apparatus of claim 8, wherein the second coil reactor includes a tube having a larger inner diameter than a tube of the second plate reactor.

10. The apparatus of claim 9, further comprising:
   a third coil reactor connected to the second coil reactor; and
   a second cross-junction connected between the second coil reactor and the third coil reactor.

11. A method of accelerated multi-stage synthesis of quantum dots, the method comprising:
   injecting a precursor to a first flow reactor which synthesizes quantum dots;
   adding the precursor to synthesized quantum dots from the first flow reactor; and transferring a mixture of the synthesized quantum dot from the first flow reactor and the precursor to a second flow reactor which synthesizes quantum dots, wherein each of the first flow reactor and the second flow reactor includes a heating stick which generates heat by electrical heating.

12. The method of claim 11, further comprising:

adding the precursor to synthesized quantum dots from the second flow reactor; and transferring a mixture of the synthesized quantum dots from the second flow reactor and the precursor to a third flow reactor which synthesizes quantum dots.

13. The method of claim 11, wherein the first flow reactor preheats the precursor injected therein.

14. The method of claim 11, wherein the first flow reactor comprises a coil reactor, and the second flow reactor comprises a plate reactor which generates a temperature gradient therein.

* * * * *